(12) United States Patent  
Fujioka

(10) Patent No.: US 10,641,275 B2  
(45) Date of Patent: May 5, 2020

(54) COMPRESSOR

(71) Applicant: Kobe Steel, Ltd., Hyogo (JP)

(72) Inventor: Koumei Fujioka, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 161 days.

(21) Appl. No.: 15/754,610

(22) PCT Filed: Sep. 1, 2016

(86) PCT No.: PCT/JP2016/075597  
§ 371 (c)(1),  
(2) Date: Feb. 23, 2018

(87) PCT Pub. No.: WO2017/038912  
PCT Pub. Date: Mar. 9, 2017

(65) Prior Publication Data  
US 2018/0283389 A1 Oct. 4, 2018

(30) Foreign Application Priority Data

Sep. 2, 2015 (JP) ................................. 2015-172518

(51) Int. Cl.  
*F04D 25/16* (2006.01)  
*F04D 17/12* (2006.01)  
(Continued)

(52) U.S. Cl.  
CPC ........... *F04D 25/163* (2013.01); *F04D 17/12* (2013.01); *F04D 29/053* (2013.01);  
(Continued)

(58) Field of Classification Search  
CPC ...... F04D 17/12; F04D 25/163; F04D 29/056; F04D 29/4206; F16H 1/227;  
(Continued)

(56) References Cited

U.S. PATENT DOCUMENTS 4,473,754 A * 9/1984 Joy ........................... F02C 1/04  
290/43  
4,687,411 A * 8/1987 Maeda .................... F16C 35/02  
384/538

(Continued)

FOREIGN PATENT DOCUMENTS

DE 102009044959 A1 3/2011  
DE 102014207283 A1 10/2014  
(Continued)

OTHER PUBLICATIONS

International Search Report issued in PCT/JP2016/075597; dated Nov. 22, 2016.

(Continued)

*Primary Examiner* — Justin D Seabe  
*Assistant Examiner* — Christopher R Legendre  
(74) *Attorney, Agent, or Firm* — Studebaker & Brackett PC

(57) ABSTRACT

This compressor is provided with a motor, a plurality of shafts each having a gear, a housing (30), and a plurality of impeller sections. The housing (30) includes a first housing element (31) and a second housing element (32) connectable to the first housing element from above and separable from the first housing element. A first upper end surface support section (41) is formed on an upper end surface of the first housing element (31). The housing (30) has at least one insertion support section (40A) having a shape that enables insertion of the gear and that supports the shaft, at a height position different from a height position of the first upper end surface support section (41).

11 Claims, 7 Drawing Sheets

(51) Int. Cl.
  *F04D 29/056* (2006.01)
  *F04D 29/42* (2006.01)
  *F16H 57/023* (2012.01)
  *F04D 29/053* (2006.01)
  *F16H 1/22* (2006.01)
  *F16H 57/022* (2012.01)
  *F16H 57/02* (2012.01)

(52) U.S. Cl.
  CPC ....... *F04D 29/056* (2013.01); *F04D 29/4206* (2013.01); *F16H 1/227* (2013.01); *F16H 57/022* (2013.01); *F16H 57/023* (2013.01); *F16H 2057/0224* (2013.01); *F16H 2057/02039* (2013.01)

(58) Field of Classification Search
  CPC ................. F16H 57/021; F16H 57/023; F16H 2057/0216; F16H 2057/0235; F16H 2057/02039
  See application file for complete search history.

(56) References Cited

U.S. PATENT DOCUMENTS

| | | | | |
|---|---|---|---|---|
| 5,154,571 | A | * | 10/1992 | Prumper ................ F04D 25/02 415/124.1 |
| 5,382,132 | A | * | 1/1995 | Mendel ................ F04D 25/163 415/122.1 |
| 5,485,719 | A | * | 1/1996 | Wulf ...................... F02C 3/107 60/785 |
| 9,631,623 | B2 | * | 4/2017 | Spanel .................... F04D 17/12 |
| 2008/0240918 | A1 | * | 10/2008 | In .......................... F04D 25/163 415/214.1 |
| 2013/0315707 | A1 | * | 11/2013 | Spanel .................... F04D 17/12 415/67 |
| 2018/0283389 | A1 | * | 10/2018 | Fujioka ................. F04D 29/053 |

FOREIGN PATENT DOCUMENTS

| | | | | |
|---|---|---|---|---|
| EP | 1895164 | A2 | | 3/2008 |
| JP | 4876868 | B2 | * | 2/2012 ........... F04D 25/163 |
| JP | 2013-060882 | A | | 4/2013 |
| NL | 276194 | A | | 10/1964 |
| WO | 2014/195390 | A1 | | 12/2014 |

OTHER PUBLICATIONS

Extended European Search Report issued by the European Patent Office dated Mar. 18, 2019, which corresponds to EP16841941.4-1007 and is related to U.S. Appl. No. 15/754,610.

* cited by examiner

COMPRESSOR

TECHNICAL FIELD

The present invention relates to a compressor.

BACKGROUND ART

Centrifugal multistage compressors are conventionally known. For example, Patent Document 1 describes a three-stage compressor. The compressor includes a motor, an input shaft having an input gear, a first pinion shaft having a first-second stage pinion gear, a second pinion shaft having a three stage pinion gear, a first stage impeller, a second stage impeller, a third stage impeller, and a step-up gear housing. The number of teeth (pitch diameter) of the input gear is set to be larger than the number of teeth (pitch diameter) of each pinion gear. The motor is connected to the input shaft such that the input shaft is drivable and rotatable. In other words, the input gear and the pinion gears each serve as a step-up gear. The first stage impeller is connected to one end of the first pinion shaft. The second stage impeller is connected to the other end of the first pinion shaft. The third stage impeller is connected to one end of the second pinion shaft. The step-up gear housing places the input gear, the first-second stage pinion gear, and the third stage pinion gear, and has a shape that allows the opposite ends of the input shaft, the opposite ends of the first pinion shaft, and the opposite ends of the second pinion shaft to be exposed. The step-up gear housing supports the input shaft, the first pinion shaft, and the second pinion shaft such that each of the first-second stage pinion gear and the third stage pinion gear is engaged with the input gear. Specifically, the step-up gear housing includes a lower step-up gear housing and an upper step-up gear housing that are separable from and connectable to each other in an up and down direction. The shafts are arranged side-by-side along a division surface between the lower and upper step-up gear housings (on an upper end surface of the lower step-up gear housing). Accordingly, supporting portions for supporting the shafts are formed on the upper end surface of the lower step-up gear housing, thereby facilitating the installation of the shafts (in particular, the input shaft that has the input gear having the large pitch diameter) in the housing. Specifically, the shafts are first placed on the supporting portions formed on the upper end surface of the lower step-up gear housing. Then, the upper step-up gear housing is connected to the lower step-up gear housing from above. Accordingly, the installation of the shafts in the housing is completed.

In the compressor described above, when the motor is driven, the first pinion shaft is rotated through the input shaft, the input gear, and the first-second stage pinion gear, and at the same time, the second pinion shaft is rotated through the input shaft, the input gear, and the third pinion gear. Accordingly, the air compressed by the first stage impeller is further compressed by the second stage impeller, and the air compressed by the second stage impeller is subsequently further compressed by the third stage impeller.

The development of multistage compressors has been recently progressed. However, in the compressor described in Patent Document 1, it is difficult to increase the number of compression stages while preventing complicated installation of the shafts in the housing, a significant increase in size of the housing, and occurrence of poor engagement between the gears.

For example, in the compressor described in Patent Document 1, if the number of compression stages is increased while preventing the complicated installation of the shafts in the housing, an additional pinion shaft will be disposed on the upper end surface of the lower step-up gear housing. In this case, the size of the housing in a direction orthogonal to the shafts disposed on the upper end surface is increased. This becomes prominent as the number of additional pinion shafts (the number of additional compression stages) increases.

In addition, if the number of compression stages is increased while preventing the increase in size of the housing in the orthogonal direction, and the complicated installation of the shafts in the housing, for example, the upper step-up gear housing will be further divided in the up and down direction, and an additional pinion shaft will be placed along a division surface of the upper step-up gear housing. In this case, the number of divisions of the housing is increased. Therefore, tolerance generated in assembling the housing is accumulated, whereby the poor engagement between the gears may occur.

CITATION LIST

Patent Document

Patent Document 1: JP 2013-60882 A

SUMMARY OF INVENTION

An object of the present invention is to provide a compressor capable of increasing the number of compression stages while preventing complicated installation of shafts in a housing, a significant increase in size of the housing, and occurrence of poor engagement between gears.

A compressor according to an aspect of the present invention includes: a motor having an output shaft; a plurality of shafts each having a gear; a housing placing the gears and supporting the shafts such that opposite ends of each of the shafts are exposed; and a plurality of impeller portions each fixed to at least one end of the opposite ends of each of the shafts. The housing includes a first housing element and a second housing element connectable to the first housing element from above and separable from the first housing element. A first upper end surface supporting section is formed on an upper end surface of the first housing element, the first upper end surface supporting section supporting some of the shafts. The housing has at least one insertion support portion at a position in height different from a position in height of the first upper end surface supporting section, the at least one insertion support portion having a shape that enables the gear to be inserted into the at least one insertion support portion and enables the shaft to be supported by the at least one insertion support portion.

DESCRIPTION OF EMBODIMENTS

A compressor according to an embodiment of the present invention will be described with reference to FIGS. 1 to 7.

Figure 1:
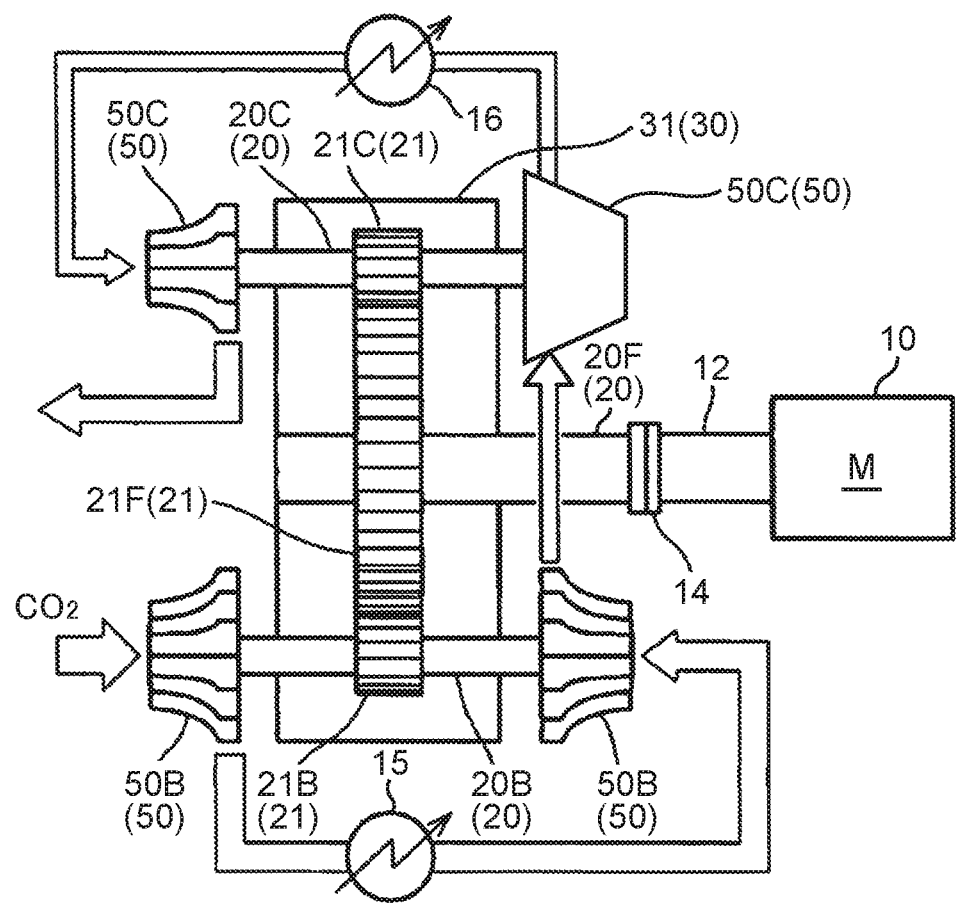
FIG. 1 is a top view schematically showing a compressor according to an embodiment of the present invention with a second housing element and a third housing element removed.

As shown in FIG. 1, the compressor includes a motor 10 having an output shaft 12, a plurality of shafts 20 each having a gear 21, a housing 30, and a plurality of impeller portions 50. In the embodiment, carbon dioxide gas is compressed by the impeller portions 50.

Figure 7:
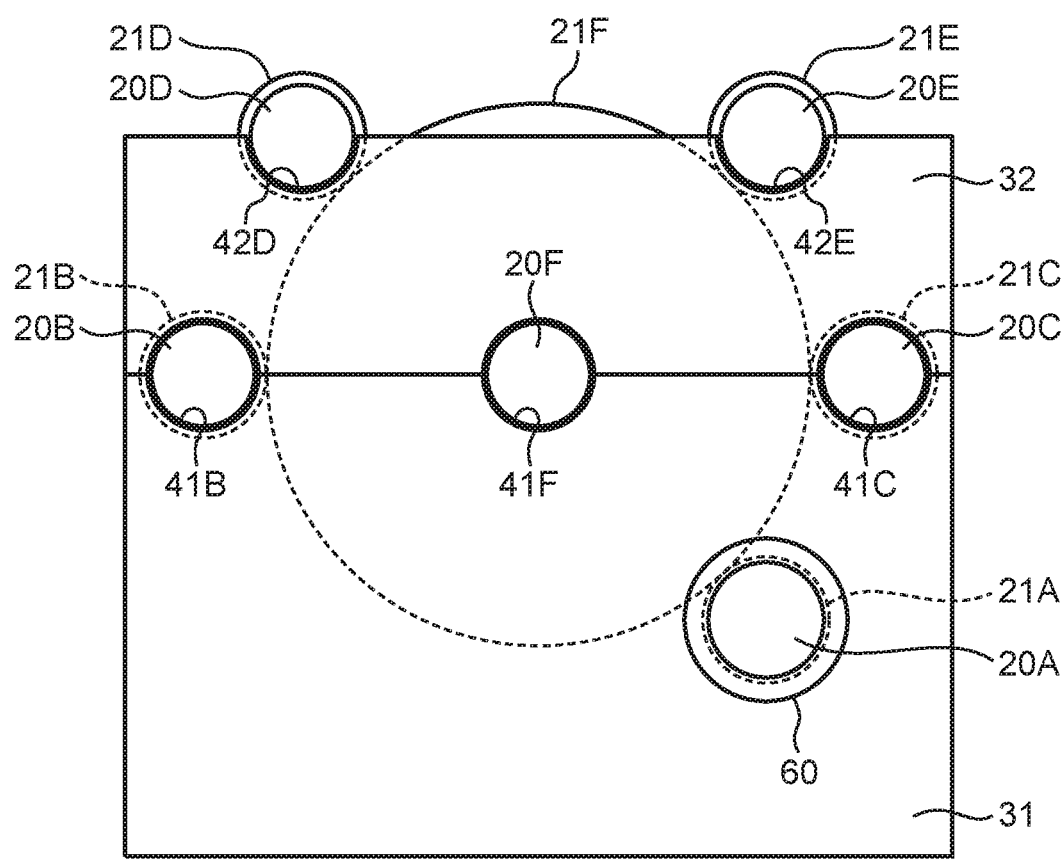
FIG. 7 is a view showing a state where a fourth shaft and a fifth shaft are installed in a second housing element.

The shafts 20 includes five shafts (a first shaft 20A to a fifth shaft 20E) and an input shaft 20F, shown in FIG. 7.

The first shaft 20A has a first pinion gear 21A as the gear 21. The second shaft 20B has a second pinion gear 21B as the gear 21. The third shaft 20C has a third pinion gear 21C as the gear 21. The fourth shaft 20D has a fourth pinion gear 21D as the gear 21. The fifth shaft 20E has a fifth pinion gear 21E as the gear 21.

The input shaft 20F has a bull gear 21F as the gear 21. The number of teeth (pitch diameter) of the bull gear 21F is set to be larger than the number of teeth (pitch diameter) of each of the pinion gears 21A to 21E. The output shaft 12 of the motor 10 is connected to the input shaft 20F via a coupling 14. The output shaft 12 may be, however, connected to one of the other shafts instead of the input shaft 20F.

Figure 2:
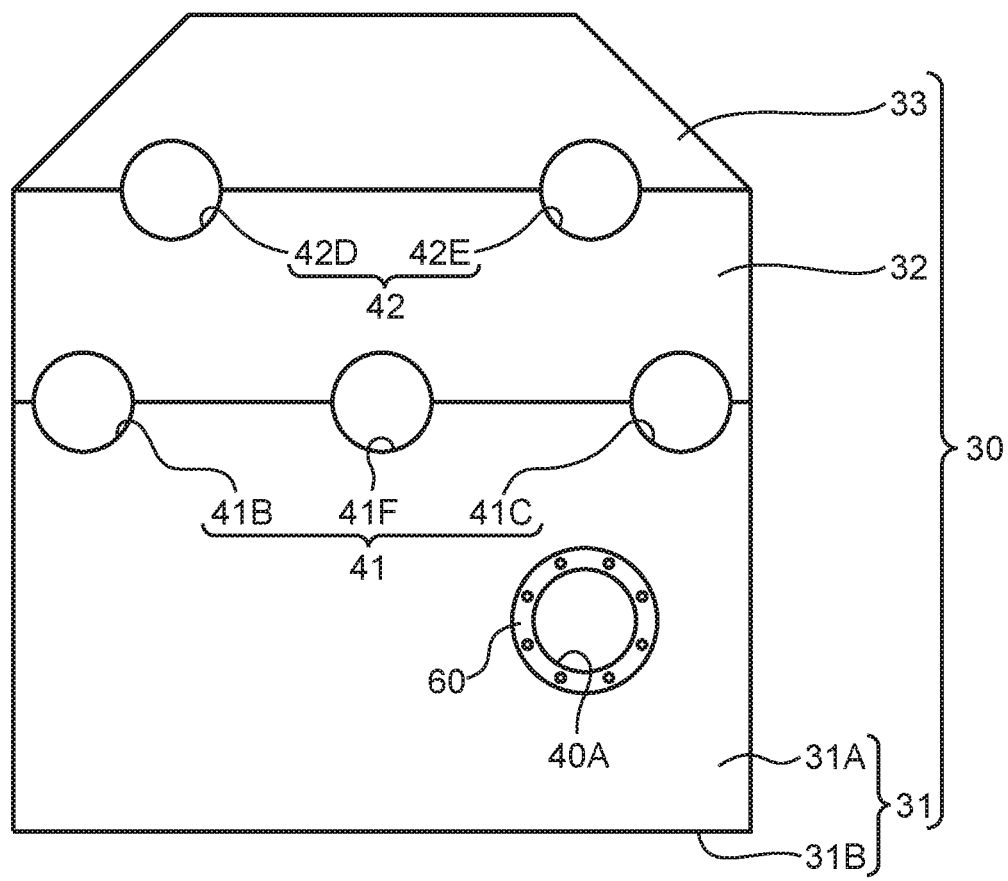
FIG. 2 is a side view showing a housing of the compressor shown in FIG. 1.

The housing 30 places the gears 21 and supports the shafts 20 such that at least one ends of each of the shafts 20 are exposed. As shown in FIG. 2, the housing 30 includes a first housing element 31, a second housing element 32, and a third housing element 33. In FIG. 2, the shafts 20 are not shown.

Figure 6:
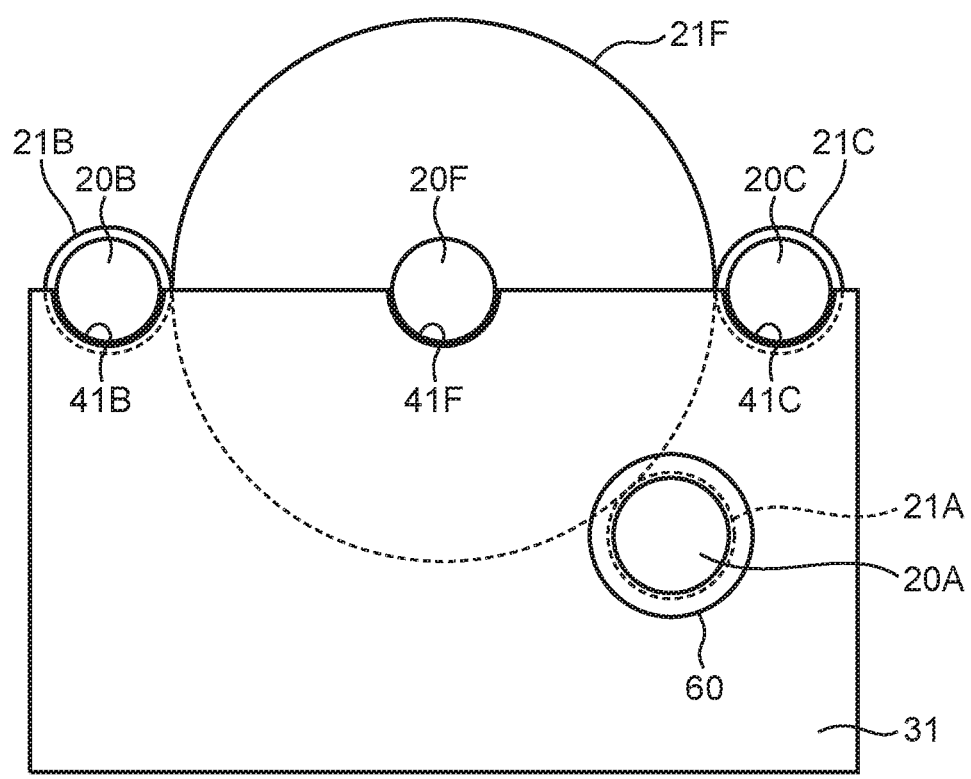
FIG. 6 is a view showing a state where an input shaft, a first shaft, a second shaft, and a third shaft are installed in a first housing element.

The first housing element 31 includes a square tubular side wall 31A and a bottom wall 31B covering an opening at a bottom of the side wall 31A. A first upper end surface supporting section 41 is formed on an upper end surface of the first housing element 31 so as to support some of the shafts 20. Specifically, the first upper end surface supporting section 41 includes a second shaft supporting portion 41B supporting the second shaft 20B, a third shaft supporting portion 41C supporting the third shaft 20C, and an input shaft supporting portion 41F supporting the input shaft 20F. The second shaft supporting portion 41B, the input shaft supporting portion 41F, and the third shaft supporting portion 41C are arranged side-by-side in this order. As shown in FIGS. 6 and 7, the second shaft supporting portion 41B is formed in such a position that allows the second shaft 20B to be supported by the second shaft supporting portion 41B such that the second pinion gear 21B is engaged with the bull gear 21F. The third shaft supporting portion 41C is formed in such a position that allows the third shaft 20C to be supported by the third shaft supporting portion 41C such that the third pinion gear 21C is engaged with the bull gear 21F. The supporting portions 41B, 41C, and 41F are formed to be recessed downwardly from the upper end surface of the side wall 31A other than the supporting portions 41B, 41C, and 41F. In the embodiment, the supporting portions 41B, 41C, and 41F are formed into a semicircular arc.

The first housing element 31 has an insertion support portion 40A supporting the first shaft 20A. As shown in FIG. 2, the insertion support portion 40A is provided in a portion of the first housing element 31, and the portion is located below a position in height of the first upper end surface supporting section 41. Specifically, as shown in FIGS. 6 and 7, the insertion support portion 40A is formed in such a position that allows the first shaft 20A to be supported by the insertion support portion 40A such that the first pinion gear 21A is engaged with the bull gear 21F. The insertion support portion 40A has a shape that enables the first pinion gear 21A to be inserted into the insertion support portion 40A and enables the first shaft 20A to be supported by the insertion support portion 40A.

The second housing element 32 is connectable to the first housing element 31 from above and is separable from the first housing element 31. The second housing element 32 is formed into a square tube. A portion of a lower end surface of the second housing element 32, which is opposite the first upper end surface supporting section 41 in the up and down direction, is formed into a semicircular arc that is recessed upwardly from the remaining portion of the lower end surface of the second housing element 32.

A second upper end surface supporting section 42 is formed on an upper end surface of the second housing element 32 so as to support some of the shafts 20. Specifically, the second upper end surface supporting section 42 includes a fourth shaft supporting portion 42D supporting the fourth shaft 20D, and a fifth shaft supporting portion 42E supporting the fifth shaft 20E. As shown in FIG. 7, the fourth shaft supporting portion 42D is formed in such a position that allows the fourth shaft 20D to be supported by the fourth shaft supporting portion 42D such that the fourth pinion gear 21D is engaged with the bull gear 21F. The fifth shaft supporting portion 42E is formed in such a position that allows the fifth shaft 20E to be supported by the fifth shaft supporting portion 42E such that the fifth pinion gear 21E is engaged with the bull gear 21F. The supporting portions 42D, 42E are formed to be recessed downwardly from the upper surface of the second housing element 32 other than the supporting portions 42D, 42E. In the embodiment, the supporting portions 42D, 42E are formed into a semicircular arc.

The third housing element 33 is connectable to the second housing element 32 from above and separable from the second housing element 32. The third housing element 33 is formed into a square tube. A portion of a lower end surface of the housing element 33, which is opposite the second upper end surface supporting section 42 in the up and down direction, is formed into a semicircular arc recessed upwardly from the remaining portion of the lower end surface of the third housing element 33.

The impeller portions 50 each are fixed to at least one end of the opposite ends of each of the first shaft 20A to the fifth shaft 20E. Accordingly, when the respective impeller portions 50 are fixed to the opposite ends of each of the shafts 20A to 20E, ten-stage compression becomes possible. The impeller portions 50 are covered by a casing (not shown), and the impeller portions 50 compress gas (in the embodiment, carbon dioxide) within the casing. For example, as shown in FIG. 1, the gas compressed by an impeller portion 50B fixed to one end of the second shaft 20B is cooled by a cooler 15, and is subsequently further compressed by an impeller portion 50B fixed to the other end of the second shaft 20B. After that, the gas compressed by an impeller portion 50C fixed to one end of the third shaft 20C is cooled by a cooler 16, and is subsequently further compressed by an impeller portion 50C fixed to the other end of the third shaft 20C. The gas is also compressed by the impeller portions 50 fixed to each of the first shaft 20A, the fourth shaft 20D, and the fifth shaft 20E, and is appropriately cooled by a cooler provided along a flow passage between the impeller portions.

Figure 3:
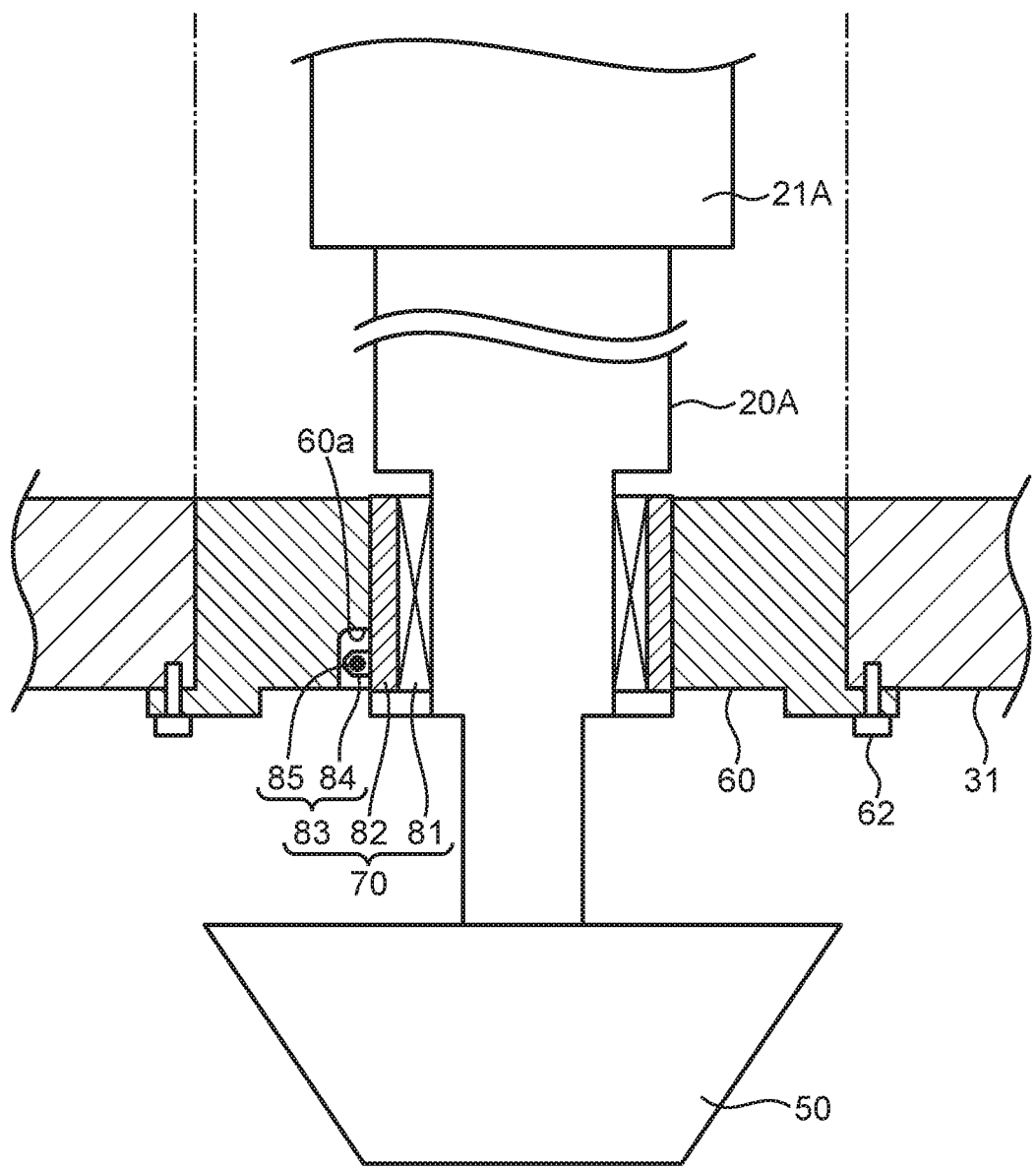
FIG. 3 is a sectional view showing an insertion bearing portion.

In the embodiment, each of the shafts 20A to 20F are received by a bearing portion 70 provided in a bearing housing 60. In FIG. 1, the bearing housings 60 and the bearing portions 70 are not shown. FIG. 2 shows only the bearing housing 60 that holds the bearing portion 70 receiving the first shaft 20A. The bearing housings 60 and the bearing portions 70 will be described below with reference to the FIGS. 3 and 4. FIG. 3 shows the bearing portion 70 receiving the first shaft 20A, and the bearing housing 60 holding this bearing portion 70.

The bearing housing 60 is formed into a ring. As shown in FIG. 3, the bearing housing 60 is fixed to the first housing element 31 by fixing tools 62 such as bolts. Specifically, the first housing element 31 has a circular through hole (insertion support portion 40A) in which the bearing housing 60 is fitted. The bearing housing 60 is fixed to a side surface of the first housing element 31 by the fixing tools 62 with the bearing housing 60 fitted in the through hole. The through hole is set to have a diameter larger than a tip diameter of the first pinion gear 21A.

Figure 4:
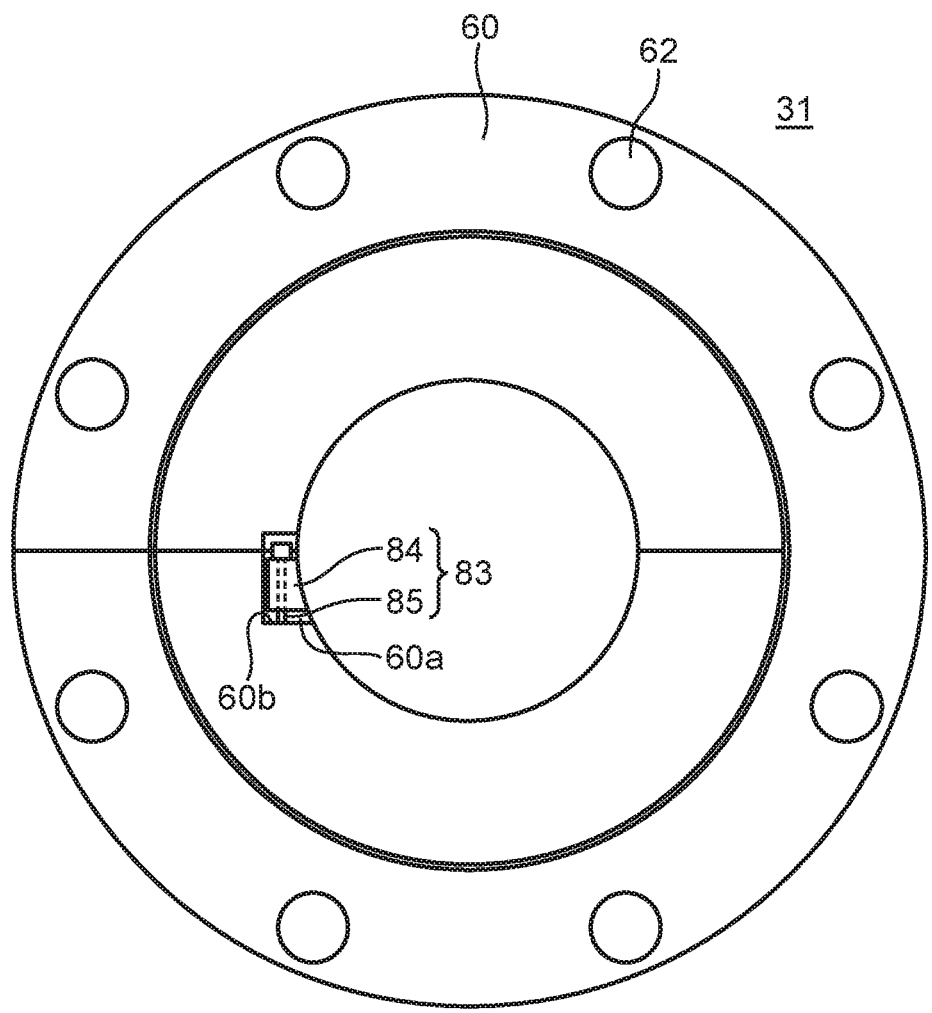
FIG. 4 is an enlarged view showing the insertion bearing portion.
Figure 5:
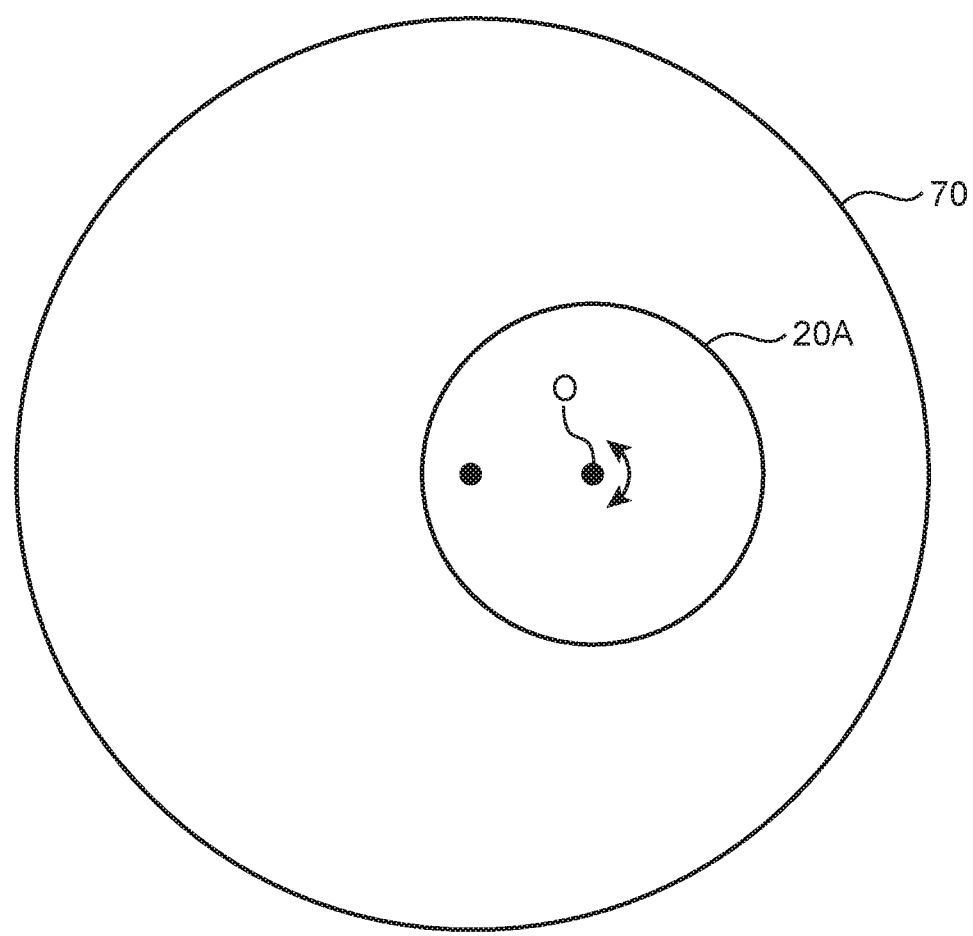
FIG. 5 is a view schematically showing a range of displacement of a shaft to be adjusted by an adjusting portion.

The bearing portion 70 includes an inner ring 81, rolling elements (not shown), an outer ring 82, and a preventing portion 83. In the embodiment, the bearing portion 70 is an eccentric bearing. The bearing portion 70 is, however, limited to the eccentric bearing. In FIG. 4, the inner ring 81 and the outer ring 82 are not shown.

The preventing portion 83 is fixed to an outer periphery of the outer ring 82 and prevents the rotation of the outer ring 82 relative to the bearing housing 60. Specifically, the bearing housing 60 includes a receiving portion 60a receiving the preventing portion 83, and the preventing portion 83 is disposed within the receiving portion 60a. More specifically, the receiving portion 60a includes a contact portion 60b that is in contact with the preventing portion 83 in a circumferential direction of the outer ring 82. The preventing portion 83 is in contact with the contact portion 60b, thereby preventing the rotation of the outer ring 82 relative to the bearing housing 60 or the first housing element 31. The receiving portion 60a has a shape recessed radially outward of the bearing housing 60 from an inner periphery of the bearing housing 60. The receiving portion 60a also has a shape that is open in a direction parallel to the central axis of the first shaft 20A (in a thickness direction of the bearing housing 60). The contact portion 60b is formed into a plane that is parallel to the first housing element 31 other than the first upper end surface supporting section 41. In the embodiment, the preventing portion 83 includes a protruded portion 84 and an adjusting portion 85.

The protruded portion 84 has a shape protruded outwardly of the outer ring 82 from the outer periphery of the outer ring 82. The protruded portion 84 has a female screw portion.

The adjusting portion 85 is a member that allows the position of the protruded portion 84 relative to the contact portion 60b to be adjusted with the adjusting portion 85 in contact with the contact portion 60b. The adjusting portion 85 has a male screw portion that is in engagement with the female screw portion with the adjusting portion 85 in contact with the contact portion 60b. The male screw portion is configured such that the male screw portion is rotated relative to the female screw portion, thereby displacing the protruded portion 84 between a first position and a second position. The first position is a position where a dimension between the protruded portion 84 and the contact portion 60b is a first dimension. The second position is a position where a dimension between the protruded portion 84 and the contact portion 60b is a second dimension larger than the first dimension. The male screw portion is rotated relative to the female screw portion, thereby displacing the position of the protruded portion 84 relative to the contact portion 60b. As a result, the position of the outer ring 82 relative to the first housing element 31 is displaced. In other words, the male screw portion is rotated relative to the female screw portion, thereby displacing the position of a central axis O of the first shaft 20A, as shown in FIG. 6. Accordingly, the engagement between the first pinion gear 21A and the bull gear 21F is adjusted.

In the embodiment, the preventing portions 83 of the bearing portions 70 receiving the second shaft 20B to the fifth shaft 20E have the same configuration (adjusting function) as the preventing portion 83 of the bearing portion 70 receiving the first shaft 20A. Meanwhile, the preventing portion 83 of the bearing portion 70 receiving the input shaft 20F has no adjusting function. The bearing portions 70 receiving the second shaft 20B to the fifth shaft 20E and the input shaft 20F, and the bearing housings 60 holding these bearing portions 70 each are formed divisible into two in the up and down direction.

A process for assembling the compressor according to the embodiment will be described next with reference to FIGS. 6 and 7.

First, the first shaft 20A is inserted into the insertion support portion 40A of the first housing element 33, and then, the bearing portion 70 and the bearing housing 60 are installed. Specifically, one end of the first shaft 20A is inserted into the insertion support portion 40A such that the first pinion gear 21A reaches the inside of the first housing element 31 through the insertion support portion 40A from the outside of the first housing element 31. Then, the bearing housing 60 is fixed to the first housing element 31 with the bearing portion 70 and the bearing housing 60 located around the other end of the first shaft 20A.

Next, three shafts, that is, the input shaft 20F, the second shaft 20B, and the third shaft 20C, are placed on the first upper end surface supporting section 41. At this time, respective lower parts (not shown) of the bearing housings 60 and respective lower parts (not shown) of the bearing portions 70 are first placed on the second shaft supporting portion 41B, the third shaft supporting portion 41C, and the input shaft supporting portion 41F. Then, the shafts 20B, 20C, and 20F are, respectively, placed on the supporting portions 41B, 41C, and 41F. Subsequently, upper parts (not shown) of the bearing housings 60 and upper parts of (not shown) the bearing portions 70 are, respectively, connected to the lower parts from above the second shaft supporting portion 41B, the third shaft supporting portion 41C, and the input shaft supporting portion 41F. After that, the second housing element 32 is connected to the first housing element 31 from above. The upper parts and the second housing element 32 may be simultaneously connected to the first housing element 31.

Subsequently, as shown in FIG. 7, the two shafts, that is, the fourth shaft 20D and the fifth shaft 20E, are placed on the second upper end surface supporting section 42. The process for placing theses shafts is the same as that for placing three shafts 20B, 20C, and 20F on the first upper end surface supporting section 41. Lastly, the upper parts of the bearing housing 60, those of the bearing portions 70, and the third housing element 33 are connected to the second housing element 32 from above.

The installation of the first shaft 20A in the first housing element 31 may be performed after the connection of the third housing element 33 to the second housing element 32. Furthermore, at any time after the input shaft 20F is supported by the input shaft supporting portion 41F, the output shaft 12 of the motor 10 is connected to the input shaft 20F.

As needed, the engagement between the bull gear 21F and each of the pinion gears 21A to 21E is adjusted by the corresponding adjusting portion 85.

As described above, in the compressor according to the embodiment, the housing 30 has the insertion support portion 40A at the position in height different from the position in height of the first upper end surface supporting section 41, and the insertion support portion 40A allows the first pinion gear 21A to be inserted thereinto. Therefore, it is possible to increase the number of compression stages while preventing the significant increase in size of the housing 30 in the direction orthogonal to the central axes of the shafts 20B, 20C, and 20F which are supported by the first upper end surface supporting section 41, the complicated installation of the shafts in the housing 30, and the occurrence of the poor engagement between the gears. Specifically, the insertion support portion 40A has a shape that enables the first pinion gear 21A to be inserted into the insertion support portion 40A and enables the first shaft 20A to be supported by the insertion support portion 40A. Accordingly, the first shaft 20A is inserted into the insertion support portion 40A such that the first pinion gear 21A reaches the inside of the housing 30 through the insertion support portion 40A from the outside of the housing 30. Thus, the first shaft 20A is installed in the housing 30. Therefore, it is possible to easily install an additional shaft in the housing 30 (increase the number of compression stages) without increasing the number of divisions of the housing 30, in other words, while preventing the occurrence of the poor engagement between the gears 21F, 21A due to accumulation of the tolerance generated in assembling the housing 30.

In addition, in the embodiment, the first upper end surface supporting section 41 includes the input shaft supporting portion 41F that supports the input shaft 20F having the bull gear 21F. The output shaft 12 of the motor 10 is connected to the input shaft 20F. Therefore, the gears can serve as step-up gears, and the complicated installation of the input shaft 20F, which has the bull gear 21F having the large number of teeth (pitch diameter) in the housing 30, can be prevented.

Furthermore, in the embodiment, the housing 30 includes the third housing element 33. The second upper end surface supporting section 42 is formed on the upper end surface of the second housing element 32. The insertion support portion 40A is formed a portion of the first housing element 31, and the portion is located below the first upper end surface supporting section 41. Therefore, it is possible to effectively increase the number of compression stages (the number of shafts) while preventing the significant increase in size of the housing 30. Specifically, the shafts 20B to 20F are supported by the first upper end surface supporting section 41 and the second upper end surface supporting section 42 located above the first upper end surface supporting section 41, and thus, the insertion support portion 40A is formed below the first upper end surface supporting section 41. Therefore, the gears 21A to 21F can be effectively disposed in a space within the housing 30.

In the embodiment, the housing 30 also can support the five shafts 20A to 20E. Therefore, when the opposite ends of each of the five shafts are fixed to the respective impeller portions 50, up to ten-stage compression becomes possible.

In addition, in the embodiment, the preventing portion 83 includes the protruded portion 84 and the adjusting portion 85. In other words, the preventing portion 83 has both a function of preventing the rotation of the outer ring 82 relative to the bearing housing 60 and a function of adjusting the positions of the central axes of the shafts (the engagement between the bull gear 21F and each of the pinion gears 21A to 21E), thereby simplifying the configuration. Specifically, the adjusting portion 85 is in contact with the contact portion 60b, thereby preventing the rotation of the outer ring 82 relative to the bearing housing 60. In addition, the position of the protruded portion 84 relative to the contact portion 60b is displaced, thereby displacing the positions of the bearing portion 70 and the central axis of the shaft supported by this bearing portion 70 relative to the bearing housing 60 (housing 30). Therefore, the engagement between the gears is adjusted.

Specifically, in the embodiment, the protruded portion 84 has the female screw portion, and the adjusting portion 85 has the male screw portion that is in engagement with the female screw portion with the adjusting portion 85 in contact with the contact portion 60b. Therefore, only rotating the adjusting portion 85, which has the male screw portion, relative to the protruded portion 84, which has the female screw portion, enables adjustment of the engagement between the gears.

Furthermore, in the embodiment, the receiving portion 60a has a shape that is open in the direction parallel to the central axes of the shafts 20A to 20E. Accordingly, the adjusting portion 85 provided within the receiving portion 60a can be adjusted from the side of the bearing housing 60, thereby facilitating adjustment of the central positions of the shafts 20A to 20E.

The embodiment according to the present invention is described above. It should be considered that the embodiment disclosed herein is exemplary in all respects, and are not limitative. The scope of the present invention is not represented by the above description but by the scope of claims, and it is intended that connotation equivalent to the scope of claims, and all changes within the scope are included.

For example, the insertion support portion 40A may be formed in the second housing element 32 or the third housing element 33. In addition, the number of insertion support portions 40A is not limited to one. For example, in FIG. 2, an additional insertion support portion may be formed in a portion of the first housing element 31, and the portion is located leftward of the portion where the insertion support portion 40A is formed.

The number of shafts each having a pinion gear is limited to five.

The second housing element 32 and the third housing element 33 may be not formed divisible but formed integrally. In this case, the fourth shaft supporting portion 42D and the fifth shaft supporting portion 42E each may have the same configuration as the insertion support portion 40A.

The bearing housings 60 and the bearing portions 70 which are placed on the first upper end surface supporting section 41 are each limited to be formed divisible in the up and down direction. In addition, the bearing housings 60 and the bearing portions 70 which are placed on the second upper end surface supporting section 42 are each limited to be formed divisible in the up and down direction.

The impeller portions 50 fixed to the first shaft 20A may be used as expanding portions, and the impeller portions 50 connected to the second shaft 20B to the fifth shaft 20E may be used as compressing portions.

The compressor according to the above embodiment will be outlined now.

The compressor according to the embodiment includes: a motor having an output shaft; a plurality of shafts each having a gear; a housing placing the gears and supporting the shafts such that opposite ends of each of the shafts are exposed; and a plurality of impeller portions each fixed to at least one end of the opposite ends of each of the shafts. The housing includes a first housing element and a second housing element connectable to the first housing element from above and separable from the first housing element. A first upper end surface supporting section is formed on an upper end surface of the first housing element, the first upper end surface supporting section supporting some of the shafts. The housing has at least one insertion support portion at a position in height different from a position in height of the first upper end surface supporting section, the at least one insertion support portion having a shape that enables the gear to be inserted into the at least one insertion support portion and enables the shaft to be supported by the at least one insertion support portion.

In the compressor according to the embodiment, the housing has the insertion support portion at the position in height different from the position in height of the first upper end surface supporting section, and the insertion support portion allows the gear to be inserted thereinto. Therefore, it is possible to increase the number of compression stages while preventing the significant increase in size of the housing in the direction orthogonal to the central axes of the shafts supported by the first upper end surface supporting section, the complicated installation of the shafts in the housing, and the occurrence of the poor engagement between the gears. Specifically, the insertion support portion has a shape that enables the gear to be inserted into the insertion support portion and enables the shaft to be supported by the insertion support portion. Accordingly, the shaft is inserted into the insertion support portion such that the gear reaches the inside of the housing through the insertion support portion from the outside of the housing. Thus, the shaft is installed in the housing. Therefore, it is possible to easily install an additional shaft in the housing (increase the number of compression stages) without increasing the number of divisions of the housing, in other words, while preventing the occurrence of the poor engagement between the gears due to accumulation of the tolerance generated in assembling the housing.

In the above compressor, the shafts may include an input shaft having a bull gear as the gear, the bull gear having the number of teeth that is larger than the number of teeth of each of the other gears. The first upper end surface supporting section may include an input shaft supporting portion that supports the input shaft such that the bull gear is engaged with each of the gears other than the bull gear. The output shaft of the motor may be connected to the input shaft.

Accordingly, the gears can serve as step-up gears, and the complicated installation of the input shaft, which has the bull gear having the large number of teeth (pitch diameter), in the housing can be prevented.

In the above compressor, the housing may further include a third housing element connectable to the second housing element from above and separable from the second housing element. A second upper end surface supporting section may be formed on an upper end surface of the second housing element, the second upper end surface supporting section supporting some of the shafts other than the input shaft. The at least one insertion support portion may be formed in a portion of the first housing element, the portion located below the first upper end surface supporting section.

Accordingly, it is possible to effectively increase the number of compression stages (shafts) while preventing the significant increase in size of the housing. Specifically, the shafts are supported by the first upper end surface supporting section and the second upper end surface supporting section located above the first upper end surface supporting section, and thus, the insertion support portion is formed below the first upper end surface supporting section. Therefore, the gears can be effectively disposed in a space within the housing.

Specifically, the shafts may include: a first shaft having a first pinion gear as the gear, the first pinion gear having the number of teeth that is smaller than the number of teeth of the bull gear; a second shaft having a second pinion gear as the gear, the second pinion gear having the number of teeth that is smaller than the number of teeth of the bull gear; a third shaft having a third pinion gear as the gear, the third pinion gear having the number of teeth that is smaller than the number of teeth of the bull gear; a fourth shaft having a fourth pinion gear as the gear, the fourth pinion gear having the number of teeth that is smaller than the number of teeth of the bull gear; and a fifth shaft having a fifth pinion gear as the gear, the fifth pinion gear having the number of teeth that is smaller than the number of teeth of the bull gear. The at least one insertion support portion may be formed in such a position that allows the first shaft to be supported by the at least one insertion support portion such that the first pinion gear is engaged with the bull gear. The first upper end surface supporting section may further include a second shaft supporting portion that supports the second shaft such that the second pinion gear is engaged with the bull gear, and a third shaft supporting portion that supports the third shaft such that the third pinion gear is engaged with the bull gear. The second upper end surface supporting section may include a fourth shaft supporting portion that supports the fourth shaft such that the fourth pinion gear is engaged with the bull gear, and a fifth shaft supporting portion that supports the fifth shaft such that the fifth pinion gear is engaged with the bull gear.

Accordingly, when the opposite ends of each of the five shafts, that is, the first shaft to the fifth shaft are fixed to the respective impeller portions, up to ten-stage compression becomes possible.

The compressor may further include a bearing housing fixed in the at least one insertion support portion, and a bearing portion receiving the shaft within the bearing housing. The bearing portion may be an eccentric bearing. The bearing portion may include an inner ring, an outer ring, and a preventing portion fixed to an outer periphery of the outer ring, the preventing portion preventing rotation of the outer ring relative to the bearing housing. The bearing housing may include a contact portion being in contact with the preventing portion in a circumferential direction of the outer ring, and a receiving portion that receives at least a portion of the preventing portion. The preventing portion may have a protruded portion that is protruded outwardly of the outer ring from the outer periphery of the outer ring, and an adjusting portion that enables a position of the protruded portion relative to the contact portion to be adjusted with the adjusting portion in contact with the contact portion.

Accordingly, the preventing portion has both a function of preventing the rotation of the outer ring relative to the bearing housing and a function of adjusting the positions of the central axes of the shafts (the engagement between the gears), thereby simplifying the configuration. Specifically, the adjusting portion is in contact with the contact portion, thereby preventing the rotation of the outer ring relative to the bearing housing. In addition, the position of the protruded portion relative to the contact portion is displaced, thereby displacing the positions of the bearing portion and the central axis of the shaft supported by this bearing portion relative to the bearing housing (housing). Thus, the engagement between the gears is adjusted.

Specifically, the protruded portion may have a female screw portion. The adjusting portion may have a male screw portion that is in engagement with the female screw portion with the adjusting portion in contact with the contact portion. The male screw portion may be configured such that the male screw portion is rotated relative to the female screw portion to displace the protruded portion between a first position where a dimension between the protruded portion and the contact portion is a first dimension and a second position where the dimension between the protruded portion and the contact portion is a second dimension larger than the first dimension.

Accordingly, only rotating the adjusting portion, which has the male screw portion, relative to the protruded portion, which has the female screw portion, enables adjustment of the engagement between the gears.

In the compressor, the receiving portion may have a shape that is open in a direction parallel to central axes of the shafts.

Accordingly, the adjusting portion provided within the receiving portion can be adjusted from the side of the bearing housing, thereby facilitating the adjustment of the central position of the shaft.

In the compressor, the impeller portions may be used as compression portions that compress gas, or some of the impeller portions that are fixed to the shafts supported by the first upper end surface supporting section may be used as compressing portions, and at least one of the impeller portions that is fixed to the shaft supported by the at least one insertion support portion may be used as an expanding portion that expands gas.

The invention claimed is:

1. A compressor, comprising:
a motor having an output shaft;
a plurality of shafts each having a gear;
a housing placing the gears and supporting the shafts such that opposite ends of each of the shafts are exposed; and
a plurality of impeller portions each fixed to at least one end of the opposite ends of each of the shafts, wherein
the housing includes a first housing element and a second housing element connectable to the first housing element from above and separable from the first housing element,
a first upper end surface supporting section is formed on an upper end surface of the first housing element, the first upper end surface supporting section supporting some of the shafts, and
the housing has at least one insertion support portion at a position in height different from a position in height of the first upper end surface supporting section, the at least one insertion support portion being a through hole formed in the housing having a size greater than a diameter of one of the gears of the plurality of shafts such that the at least one insertion support portion enables the one of the gears to be inserted into the at least one insertion support portion and enables the shaft which bears said one of the gears to be supported by the at least one insertion support portion.

2. The compressor according to claim 1, wherein
the plurality of shafts includes an input shaft having a bull gear as the respective gear, the bull gear having a number of teeth that is larger than a number of teeth of each of the other gears,
the first upper end surface supporting section includes an input shaft supporting portion that supports the input shaft such that the bull gear is engaged with each of the other gears, and
the output shaft of the motor is connected to the input shaft.

3. The compressor according to claim 2, wherein
the housing further includes a third housing element connectable to the second housing element from above and separable from the second housing element,
a second upper end surface supporting section is formed on an upper end surface of the second housing element, the second upper end surface supporting section supporting some of the shafts other than the input shaft, and
the at least one insertion support portion is formed in a portion of the first housing element, the portion of the first housing element being located below the first upper end surface supporting section.

4. The compressor according to claim 3, further comprising
a bearing housing fixed in the at least one insertion support portion, and
a bearing portion receiving the shaft which bears said one of the gears within the bearing housing, wherein
the bearing portion is an eccentric bearing,
the bearing portion includes an inner ring, an outer ring, and a preventing portion fixed to an outer periphery of the outer ring, the preventing portion preventing rotation of the outer ring relative to the bearing housing,
the bearing housing includes a contact portion being in contact with the preventing portion in a circumferential direction of the outer ring, and a receiving portion that receives at least a portion of the preventing portion, and
the preventing portion has a protruded portion that is protruded outwardly of the outer ring from the outer periphery of the outer ring, and an adjusting portion that enables a position of the protruded portion relative to the contact portion to be adjusted with the adjusting portion in contact with the contact portion.

5. The compressor according to claim 2, further comprising
a bearing housing fixed in the at least one insertion support portion, and
a bearing portion receiving the shaft which bears said one of the gears within the bearing housing, wherein
the bearing portion is an eccentric bearing,
the bearing portion includes an inner ring, an outer ring, and a preventing portion fixed to an outer periphery of the outer ring, the preventing portion preventing rotation of the outer ring relative to the bearing housing,
the bearing housing includes a contact portion being in contact with the preventing portion in a circumferential direction of the outer ring, and a receiving portion that receives at least a portion of the preventing portion, and
the preventing portion has a protruded portion that is protruded outwardly of the outer ring from the outer periphery of the outer ring, and an adjusting portion that enables a position of the protruded portion relative to the contact portion to be adjusted with the adjusting portion in contact with the contact portion.

6. The compressor according to claim 3, wherein
the plurality of shafts includes: a first shaft having a first pinion gear as the respective gear, the first pinion gear having a number of teeth that is smaller than the number of teeth of the bull gear; a second shaft having a second pinion gear as the respective gear, the second pinion gear having a number of teeth that is smaller than the number of teeth of the bull gear; a third shaft having a third pinion gear as the respective gear, the third pinion gear having a number of teeth that is smaller than a number of teeth of the bull gear; a fourth shaft having a fourth pinion gear as the respective gear, the fourth pinion gear having a number of teeth that is smaller than a number of teeth of the bull gear, and a fifth shaft having a fifth pinion gear as the respective gear, the fifth pinion gear having a number of teeth that is smaller than a number of teeth of the bull gear,
the at least one insertion support portion is formed in such a position that allows the first shaft to be supported by the at least one insertion support portion such that the first pinion gear is engaged with the bull gear,
the first upper end surface supporting section further includes a second shaft supporting portion that supports the second shaft such that the second pinion gear is engaged with the bull gear, and a third shaft supporting portion that supports the third shaft such that the third pinion gear is engaged with the bull gear, and
the second upper end surface supporting section includes a fourth shaft supporting portion that supports the fourth shaft such that the fourth pinion gear is engaged with the bull gear, and a fifth shaft supporting portion that supports the fifth shaft such that the fifth pinion gear is engaged with the bull gear.

7. The compressor according to claim 6, further comprising
a bearing housing fixed in the at least one insertion support portion, and
a bearing portion receiving the shaft which bears said one of the gears within the bearing housing, wherein
the bearing portion is an eccentric bearing,
the bearing portion includes an inner ring, an outer ring, and a preventing portion fixed to an outer periphery of the outer ring, the preventing portion preventing rotation of the outer ring relative to the bearing housing,
the bearing housing includes a contact portion being in contact with the preventing portion in a circumferential direction of the outer ring, and a receiving portion that receives at least a portion of the preventing portion, and
the preventing portion has a protruded portion that is protruded outwardly of the outer ring from the outer periphery of the outer ring, and an adjusting portion that enables a position of the protruded portion relative to the contact portion to be adjusted with the adjusting portion in contact with the contact portion.

8. The compressor according to claim 1, further comprising
a bearing housing fixed in the at least one insertion support portion, and
a bearing portion receiving the shaft which bears said one of the gears within the bearing housing, wherein
the bearing portion is an eccentric bearing,
the bearing portion includes an inner ring, an outer ring, and a preventing portion fixed to an outer periphery of the outer ring, the preventing portion preventing rotation of the outer ring relative to the bearing housing,
the bearing housing includes a contact portion being in contact with the preventing portion in a circumferential direction of the outer ring, and a receiving portion that receives at least a portion of the preventing portion, and
the preventing portion has a protruded portion that is protruded outwardly of the outer ring from the outer periphery of the outer ring, and an adjusting portion that enables a position of the protruded portion relative to the contact portion to be adjusted with the adjusting portion in contact with the contact portion.

9. The compressor according to claim 8,
the protruded portion has a female screw portion,
the adjusting portion has a male screw portion that is in engagement with the female screw portion with the adjusting portion in contact with the contact portion, and
the male screw portion is configured such that the male screw portion is rotated relative to the female screw portion to displace the protruded portion between a first position where a dimension between the protruded portion and the contact portion is a first dimension and a second position where the dimension between the protruded portion and the contact portion is a second dimension larger than the first dimension.

10. The compressor according to claim 8, wherein
the receiving portion has a shape that is open in a direction parallel to central axes of the shafts.

11. The compressor according to claim 1, wherein
the impeller portions are used as compression portions that compress gas, or
some of the impeller portions that are fixed to the shafts supported by the first upper end surface supporting section are used as compressing portions; and at least one of the impeller portions that is fixed to the shaft which bears said one of the gears supported by the at least one insertion support portion is used as an expanding portion that expands gas.

* * * * *